United States Patent
Volk

(10) Patent No.: US 11,754,129 B2
(45) Date of Patent: Sep. 12, 2023

(54) METHOD FOR INSTALLING A WRAP SPRING

(71) Applicant: Schaeffler Technologies AG & Co. KG, Herzogenaurach (DE)

(72) Inventor: Wolfgang Volk, Frensdorf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 156 days.

(21) Appl. No.: 17/436,403

(22) PCT Filed: Feb. 13, 2020

(86) PCT No.: PCT/DE2020/100098
§ 371 (c)(1),
(2) Date: Sep. 3, 2021

(87) PCT Pub. No.: WO2020/200352
PCT Pub. Date: Oct. 8, 2020

(65) Prior Publication Data
US 2022/0145947 A1    May 12, 2022

(30) Foreign Application Priority Data
Apr. 3, 2019   (DE) .................. 10 2019 108 656.6

(51) Int. Cl.
*F16D 41/20*      (2006.01)
*F16F 15/12*      (2006.01)
(Continued)

(52) U.S. Cl.
CPC .......... *F16D 41/206* (2013.01); *B23P 19/048* (2013.01); *F16F 15/1203* (2013.01);
(Continued)

(58) Field of Classification Search
CPC .................... B23P 11/02; B23P 19/048; F16D 2250/0084; F16D 2300/12; F16D 3/12;
(Continued)

(56) References Cited

U.S. PATENT DOCUMENTS

2015/0128401 A1* 5/2015 Pennington ............. F16F 15/20
  29/451
2015/0167816 A1  6/2015 Li
(Continued)

FOREIGN PATENT DOCUMENTS

CN       104160168 A    11/2014
DE         392584 C1      3/1924
(Continued)

*Primary Examiner* — Matthew P Travers

(57) ABSTRACT

A method for installing a wrap spring includes providing a first sleeve with a first longitudinal axis extending in an axial direction and a lateral surface, and the wrap spring designed to frictionally abut the lateral surface. The wrap spring includes a nominal diameter and a central axis. The method includes applying the wrap spring in a relaxed state to the lateral surface at an angle α between the central axis and the first longitudinal axis, elastically twisting the wrap spring to change the nominal diameter while the wrap spring contacts the lateral surface, reducing the angle α, threading the wrap spring onto the first sleeve, and relaxing the wrap spring to establish frictional contact with the lateral surface.

14 Claims, 2 Drawing Sheets

(51) Int. Cl.
*F16F 15/121* (2006.01)
*F16F 7/06* (2006.01)
*F16D 13/12* (2006.01)
*F16D 13/08* (2006.01)
*B23P 19/04* (2006.01)

(52) U.S. Cl.
CPC ............ *F16D 13/08* (2013.01); *F16D 13/12* (2013.01); *F16D 2250/0084* (2013.01); *F16D 2300/12* (2013.01); *F16F 7/065* (2013.01); *F16F 15/1216* (2013.01); *F16F 2226/04* (2013.01)

(58) Field of Classification Search
CPC ........ F16D 13/025; F16D 13/08; F16D 13/12; F16D 41/206; F16F 15/1203; F16F 2226/04; F16F 7/065; F16F 15/1216; F16H 2055/366
See application file for complete search history.

(56) References Cited

U.S. PATENT DOCUMENTS

| | | | |
|---|---|---|---|
| 2015/0184703 A1* | 7/2015 | Shimamura | F16F 15/1216 192/41 S |
| 2021/0199186 A1* | 7/2021 | Ilo | F16F 1/065 |

FOREIGN PATENT DOCUMENTS

| | | |
|---|---|---|
| DE | 102009007050 A1 | 8/2010 |
| DE | 102009052611 A1 | 5/2011 |
| DE | 202016003558 U1 | 7/2016 |
| DE | 102015224608 A1 | 6/2017 |
| JP | 2010162967 A | 7/2010 |
| KR | 20070026192 A | 3/2007 |

* cited by examiner

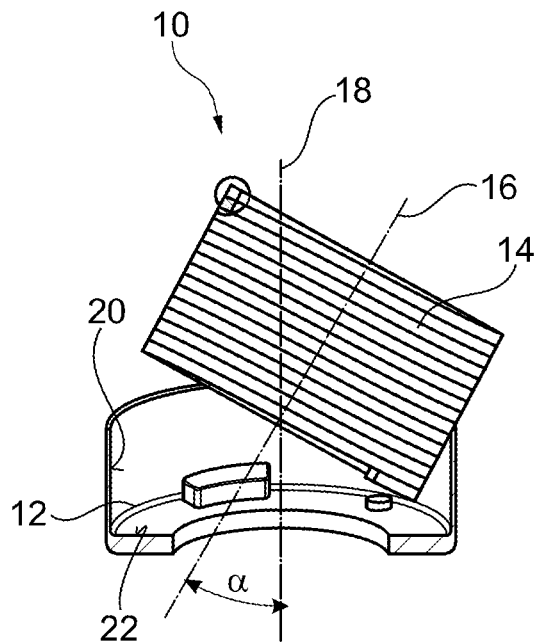
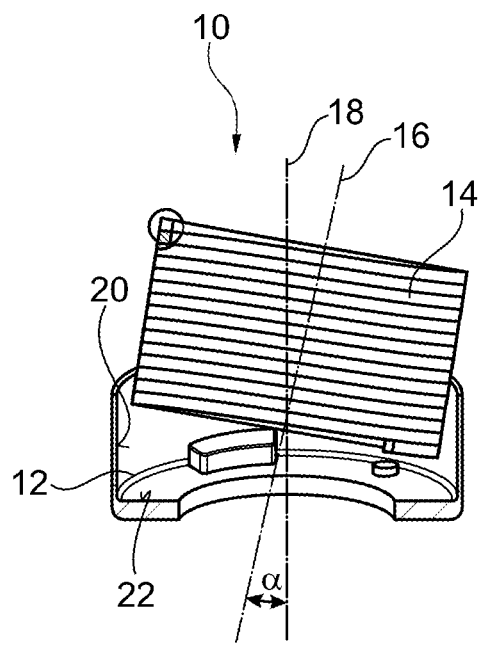
Fig. 1              Fig. 2
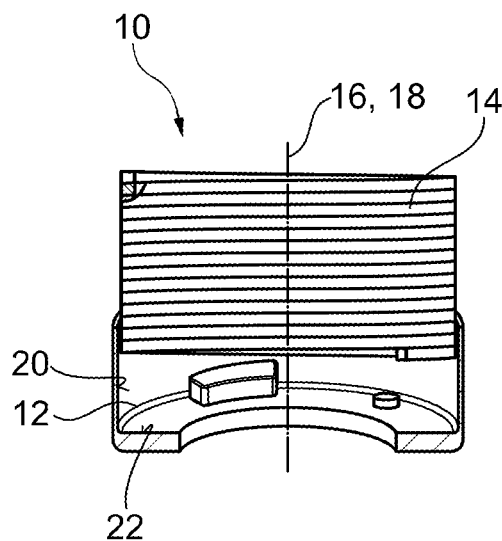
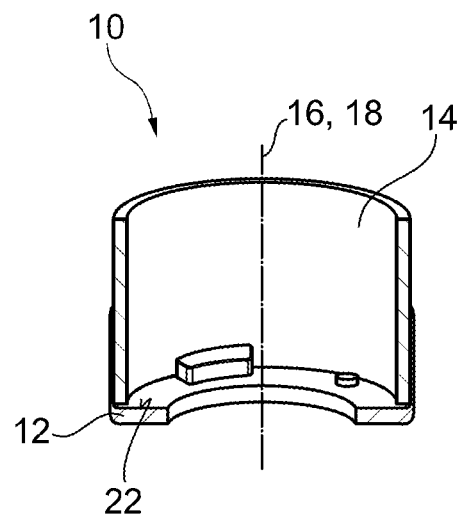
Fig. 3              Fig. 4

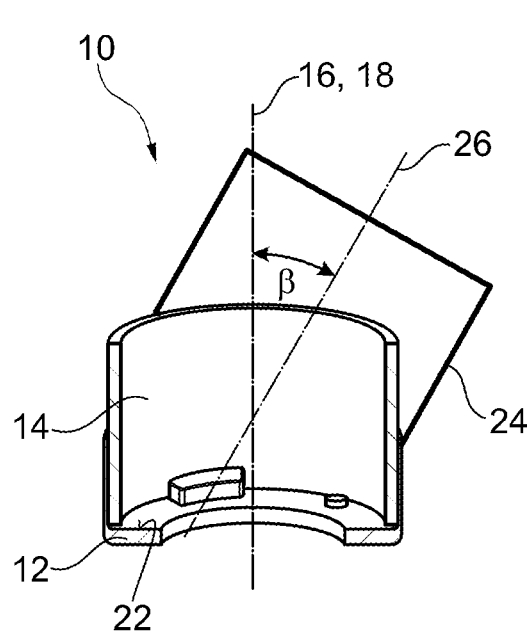
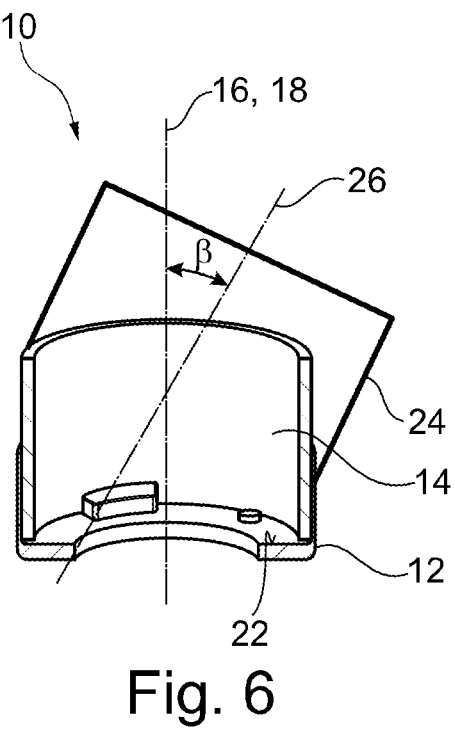
Fig. 5　　　　　Fig. 6
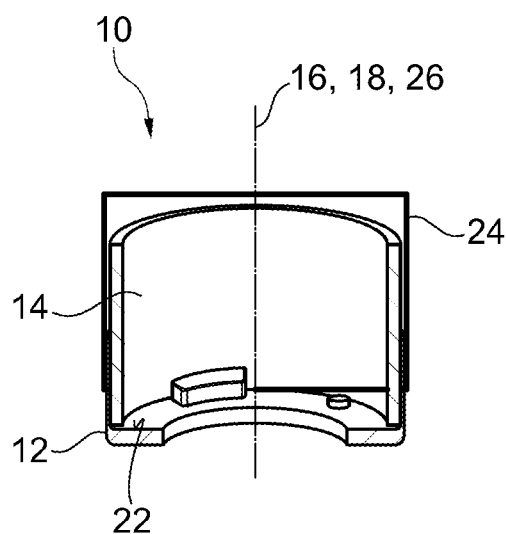
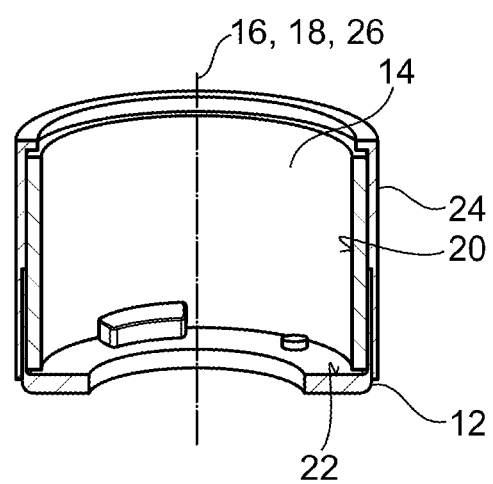
Fig. 7　　　　　Fig. 8

METHOD FOR INSTALLING A WRAP SPRING

CROSS-REFERENCE TO RELATED APPLICATIONS

This application is the United States National Phase of PCT Appln. No. PCT/DE2020/100098 filed Feb. 13, 2020, which claims priority to German Application No. DE102019108656.6 filed Apr. 3, 2019, the entire disclosures of which are incorporated by reference herein.

TECHNICAL FIELD

The disclosure relates to a method with the aid of which a wrap spring provided for frictional abutting on a sleeve can be installed.

BACKGROUND

For example, from DE 10 2009 052 611 A1 it is known to provide a wrap spring between an inner sleeve and an outer sleeve. A frictional engagement with the inner sleeve or the outer sleeve can be established or canceled by a twisting of the wrap spring in or against the winding direction, for example by producing or interrupting a torque flow between an engine shaft of a motor vehicle engine of a motor vehicle and a belt pulley for driving auxiliary units. For the wrap spring to produce a frictional engagement in the relaxed state, it is necessary for the installation to twist the wrap spring elastically in or against the winding direction to such an extent that the tensioned wrap spring can be threaded thereonto over an insertion bevel. However, it has been found that the tensioned wrap spring can get stuck when threading and the threading fails.

SUMMARY

According to the disclosure, a method for installing a wrap spring is provided in which a first sleeve is provided, a wrap spring provided for frictionally abutting a lateral surface of the first sleeve in the relaxed state is applied to a first longitudinal axis of the first sleeve extending in the axial direction at an angle thereto on the lateral surface of the first sleeve, then the wrap spring is elastically twisted to change the nominal diameter thereof. While the wrap spring contacts the lateral surface of the first sleeve, a resulting angle between the first longitudinal axis of the first sleeve and a central axis of the wrap spring is reduced. The wrap spring on the first sleeve is threaded onto the first sleeve, e.g., inserted into the first sleeve or attached to the first sleeve, and subsequently the wrap spring is relaxed to produce frictional contact with the lateral surface of the first sleeve.

Instead of applying the wrap spring coaxially and threading it over a funnel-shaped insertion bevel, the wrap spring is deliberately applied at an angle. As a result, a friction-related contact of the wrap spring with the first sleeve does not take place over the entire circumference of the wrap spring, but only in a more tangential partial region of the wrap spring. When the wrap spring is tensioned, if the wrap spring is twisted in or against the winding direction, the elastic deformation of the wrap spring can be more easily distributed over the entire axial extent of the wrap spring without an active frictional force frictionally jamming a relative movement of the wrap spring during tensioning. The inclined alignment of the wrap spring can reduce the frictional surface that acts thereon and minimize a friction torque that opposes the tensioning of the wrap spring. The risk of the wrap spring jamming while threading is thus avoided or at least significantly reduced. As a result, the wrap spring can also be easily installed in an automated manner, for example with the aid of robot arms. A sudden resistance force, which exceeds the force applied by a motor for the robot arm and causes an unscheduled shutdown of the robot arm, can be avoided. By applying and threading the wrap spring at an angle, unnecessary friction-related resistance forces of the first sleeve can be avoided, allowing for simple, e.g., automated, installation of a wrap spring.

The wrap spring can be part of a wrap spring clutch in which the first sleeve can be frictionally coupled to the second sleeve or to a further sleeve or shaft. For this purpose, the wrap spring, which is wound cylindrically in the manner of a helical spring, can be elastically deformed along or against the winding direction thereof, as a result of which the diameter of the cylindrical part of the wrap spring changes. If the diameter of the wrap spring becomes smaller in this case, the wrap spring can rest against a radially inner lateral surface of an inner sleeve and produce a frictional engagement according to the principle of rope friction. When the diameter of the wrap spring is larger, the wrap spring can rest against a radially outside lateral surface of an outer sleeve and produce a frictional engagement according to the principle of rope friction. The wrap spring can be fastened to the other sleeve, e.g., in a form-fitting manner, for example via a protruding leg.

The twisting of the wrap spring and the threading take can place at least temporarily at the same time. The wrap spring twisted along or against the winding direction can thereby slide along the sleeve while skewing around. This results not only in a relative movement of the partial region of the wrap spring resting on the sleeve in the threading direction, but also transversely to the threading direction as a result of the twisting. Due to the different movement components and the increased relative speed, a friction-related getting stuck of the wrap spring is avoided or at least less likely.

The reduction of the angle and the threading may be carried out at least temporarily at the same time. As a result of the threading, the wrap spring can continue to dip into the sleeve or be pushed onto the sleeve. By reducing the angle between the central axis of the wrap spring and the first longitudinal axis of the first sleeve, the wrap spring can be oriented relative to the first sleeve such that a contact pressure between the adjacent part of the wrap spring and the first sleeve remains low, e.g., kept essentially constant. A friction-related getting stuck of the wrap spring can be avoided or is at least less likely.

After being threaded, the wrap spring can protrude partially in the axial direction from the first sleeve. The axial extension of the wrap spring can be greater than the axial extension of the first sleeve. This leaves enough material of the wrap spring to be able to hold the wrap spring in place during threading and twisting. In addition, the individual coils of the wrap spring can more easily compensate for each other in the elastically tensioned state, so that an essentially identical elastic deformation results over the axial extent of the wrap spring. A friction-related getting stuck of the wrap spring can be avoided or is at least less likely.

For example, the first sleeve has a first axial stop, and the wrap spring is threaded onto the first sleeve until the wrap spring strikes axially against the first axial stop. The relative axial position of the wrap spring in the threaded-on state relative to the first sleeve can thereby easily be specified. In addition, when the wrap spring strikes the first axial stop, there is automatically a resistance force against further threading so that a detection of this resistance force can be used as a signal for the end of the threading step. This facilitates the automation of the installation process.

Only a part of the coils of the wrap spring, e.g., only six to eight coils, may be set at an angle on the lateral surface during threading. The region of the wrap spring that is exposed to a frictional load when threading can thereby be kept small. At the same time, the wrap spring can be supported over a sufficiently long axial region by the first sleeve during threading to ensure precise threading.

A second sleeve may be provided which frictionally contacts the wrap spring in the relaxed state of the wrap spring. The second sleeve may be applied to the wrap spring threaded onto the first sleeve in the tensioned state and then the second sleeve is threaded onto the wrap spring, e.g., on the second sleeve is attached to or inserted into the second sleeve. A second longitudinal axis of the second sleeve can be oriented at an angle relative to the central axis of the wrap spring at least one point in time between the application of the second sleeve to the tensioned wrap spring and the complete threading of the second sleeve. The installation of the second sleeve can, for example, take place essentially analogously to the installation of the wrap spring with the first sleeve. By applying the second sleeve at an angle and threading it onto the wrap spring, unnecessary friction-related resistance forces can be avoided, so that a simple, e.g., automated, installation, of a wrap spring clutch, for example, is enabled.

It is possible for the first sleeve to be provided outside the wrap spring and the second sleeve to be provided inside the wrap spring, or vice versa. Alternatively, the first sleeve and the second sleeve can both be provided outside or both inside the wrap spring and may be connected to one another, so that it is possible to receive the wrap spring in the axial direction between the first sleeve and the second sleeve in a captive manner. The first sleeve and the second sleeve can form a common lateral surface on which the wrap spring, e.g., in the relaxed state, can produce a frictional engagement based on the rope friction principle.

The second longitudinal axis of the second sleeve may experience a wobble during threading. The second longitudinal axis can rotate at least over part of the circumferential direction about the longitudinal axis of the wrap spring during threading. A friction-related getting stuck of the wrap spring on the second sleeve can be avoided or is at least less likely. Additionally or alternatively, the wrap spring experiences a wobble while being threaded onto the first sleeve.

The wrap spring may be relaxed only after the second sleeve has been threaded on. A frictional coupling of the wrap spring with the first sleeve or with the second sleeve in the relaxed state is only carried out when the intended relative position of the first sleeve and the second sleeve has been reached. Unnecessary frictional effects, which can complicate installation, can thus be avoided.

The wrap spring may be applied to the first sleeve with the aid of a first robot arm, twisted and threaded onto the first sleeve, and, for example, with the aid of a second robot arm, the second sleeve may be applied to the wrap spring and threaded onto the wrap spring. Since the wrap spring can be prevented from getting stuck during installation, the installation process can be automated with the aid of robot arms. The robot arm can be designed as a pneumatic gripper and/or can be driven with the aid of a servo motor. The robot arm may be part of a six-axis robot.

BRIEF DESCRIPTION OF THE DRAWINGS

In the following, the disclosure is explained by way of example with reference to the accompanying drawings using exemplary embodiments, in which the features shown below can represent an aspect of the disclosure both individually and in combination. In the figures:

FIG. 1 shows a schematic sectional view of a wrap spring clutch at a first installation time point, FIG. 2 shows a schematic sectional view of the wrap spring clutch at a second installation time point, FIG. 3 shows a schematic sectional view of the wrap spring clutch at a third installation time point, FIG. 4 shows a schematic sectional view of the wrap spring clutch at a fourth installation time point, FIG. 5 shows a schematic sectional view of the wrap spring clutch at a fifth installation time point, FIG. 6 shows a schematic sectional view of the wrap spring clutch at a sixth installation time point, FIG. 7 shows a schematic sectional view of the wrap spring clutch at a seventh installation time point, and FIG. 8 shows a schematic sectional view of the wrap spring clutch at an eighth installation time point.

DETAILED DESCRIPTION

To install the wrap spring clutch 10 partially shown in FIG. 1, a first sleeve 12 is initially provided, into which a wrap spring 14 is to be inserted. For this purpose, a robot arm gripping the wrap spring 14 can apply the wrap spring 14 at an angle to the first sleeve 12 by providing an angle α between a central axis 16 of the wrap spring 14 and a first longitudinal axis 18 of the first sleeve. The wrap spring 14 can be elastically twisted in the winding direction before it is applied to the first sleeve 12, while it is applied to the first sleeve 12 or after it is applied to the first sleeve 12, so that the outer diameter of the wrap spring 14 is reduced. In the elastically twisted state of the wrap spring 14, the external diameter of the wrap spring 14 is smaller than an internal diameter of an internal lateral surface 20 of the first sleeve 12.

The wrap spring 14 can be threaded onto the first sleeve 12 by inserting the wrap spring 14 into the first sleeve 12, as shown in FIG. 2. Here, a few coils of the wrap spring 14 at an angle can slide off the edge of the lateral surface 20. In addition, the angle α between the central axis 16 of the wrap spring 14 and the first longitudinal axis 18 can be reduced until the angle α is 0° and the wrap spring 14 is completely set up to be coaxial with the first sleeve 12, as shown in FIG. 3. If the wrap spring 14 has not yet reached the designated axial position thereof relative to the first sleeve 12, the wrap spring 14 can be inserted further into the first sleeve 12 via an axial relative movement until the wrap spring 14 strikes a first axial stop 22 of the first sleeve 12, as shown in FIG. 4. In this case, the wrap spring 14 can protrude somewhat in the axial direction from the first sleeve 12.

As shown in FIG. 5, a second sleeve 24 can be applied at an angle to the protruding part of the wrap spring 14. A second longitudinal axis 26 can be set at an angle β to the central axis 16 of the wrap spring 14 and at an angle to the first longitudinal axis 18. The second sleeve 24 can slide on the first sleeve 12 and/or on the wrap spring 14 in the axial direction, as shown in FIG. 6. Here, the second sleeve 24 can stand up and be arranged to be coaxial to the wrap spring 14, as shown in FIG. 7. In the exemplary embodiment shown, both the first sleeve 12 and the second sleeve 24 are arranged radially outside of the wrap spring 14. When the second sleeve 24 is completely threaded, as shown in FIG. 8, the first sleeve 12 and the second sleeve 24 can be connected to one another and form a common, radially inwardly facing lateral surface 20 on which the wrap spring 14 in the finally relaxed state can produce a frictional engagement.

A further sleeve or shaft can be inserted radially within the wrap spring 14, with which the wrap spring 14 can be connected in a fixed manner to one end of the windings, for example to form the complete wrap spring clutch 10 within a belt pulley for driving ancillary units of a motor vehicle.

REFERENCE NUMERALS

10 Wrap spring clutch
12 First sleeve
14 Wrap spring
16 Central axis
18 First longitudinal axis
20 Lateral surface
22 First axial stop
24 Second sleeve
26 Second longitudinal axis
α Angle
β Angle

The invention claimed is:

1. A method for installing a wrap spring, comprising providing a first sleeve comprising:
   a first longitudinal axis extending in an axial direction; and
   a lateral surface;
providing a wrap spring designed to frictionally abut the lateral surface, the wrap spring comprising:
   a nominal diameter; and
   a central axis;
applying the wrap spring in a relaxed state to the lateral surface at an angle α between the central axis and the first longitudinal axis;
elastically twisting the wrap spring to change the nominal diameter while the wrap spring contacts the lateral surface;
reducing the angle α;
threading the wrap spring onto the first sleeve; and
relaxing the wrap spring to establish frictional contact with the lateral surface.

2. The method of claim 1 wherein the threading the wrap spring onto the first sleeve comprises:
   inserting the wrap spring into the first sleeve; or
   slipping the wrap spring onto the first sleeve.

3. The method of claim 1 wherein the elastically twisting the wrap spring and the threading the wrap spring take place at least temporarily at the same time.

4. The method of claim 1 wherein the reducing the angle α and the threading the wrap spring take place at least temporarily at the same time.

5. The method of claim 1 wherein, after the threading the wrap spring the wrap spring protrudes partially from the first sleeve in the axial direction.

6. The method of claim 1 wherein:
   the first sleeve comprises a first axial stop; and
   the threading the wrap spring comprises the wrap spring axially striking the first axial stop.

7. The method of claim 1 wherein:
   the wrap spring comprises a plurality of coils; and
   only some of the plurality of coils slide at the angle α on the lateral surface during the threading the wrap spring.

8. The method of claim 7 wherein the only some of the plurality of coils is exactly six to eight coils.

9. The method of claim 1 further comprising providing a robot arm, wherein the applying the wrap spring, the elastically twisting the wrap spring and the threading the wrap spring is aided by the robot arm.

10. The method of claim 1 further comprising:
    providing a second sleeve arranged to frictionally contact the wrap spring in the relaxed state, the second sleeve comprising a second longitudinal axis;
    applying the second sleeve to the wrap spring at an angle β between the second longitudinal axis and the central axis after the threading the wrap spring and before the relaxing the wrap spring; and
    threading the second sleeve onto the wrap spring.

11. The method of claim 10 wherein the threading the second sleeve comprises:
    pushing the second sleeve onto the first sleeve; or
    inserting the second sleeve into the first sleeve.

12. The method of claim 10 wherein the second longitudinal axis wobbles during the threading the second sleeve.

13. The method of claim 10 wherein the relaxing the wrap spring is after the threading the second sleeve.

14. The method of claim 10 further comprising providing a robot arm, wherein the applying the wrap spring, the elastically twisting the wrap spring, the threading the wrap spring, the applying the second sleeve and the threading the second sleeve is aided by the robot arm.

* * * * *